Patented May 21, 1935

2,002,345

UNITED STATES PATENT OFFICE 2,002,345

PROCESS OF MAKING CHEESE

Carl Frehner, Evansville, Wis.

No Drawing. Application May 4, 1933, Serial No. 669,372

7 Claims. (Cl. 99—11)

This invention relates to cheese and cheese-containing compositions and the process of making the same. It relates more particularly to cheese and cheese-containing compositions sometimes called process cheese and sometimes loaf cheese, and to the process of making the same. It is one of the objects of the invention to improve cheese and the process of making it.

In the making of loaf-type cheese, natural cheese is usually first comminuted, that is, sub-divided in some way as by shredding, grinding and the like. That is done for the purpose of rendering the melting or cooking thereof easier and to facilitate the admixture, if desired, of various ingredients.

The comminuted cheese is heated, usually in steam heated kettles. A suitable melting or cooking temperature is approximately 190 degrees Fahrenheit. In case the cheese does not contain enough natural moisture a predetermined amount of water is added. At times butter, pimento, or other ingredients, are also added depending upon the type of cheese it is desired to manufacture. The mass in the kettles is suitably stirred and mixed and is then poured hot into suitable containers, of various shapes, lined with tinfoil, or into glass or other jars. Where the term loaf-type cheese is used in this specification it is therefore to be understood that it is the type of cheese referred to rather than the particular form in which it reaches the consumer, whether in the shape of a loaf, or other shapes in cartons, or in jars.

It has been found that for various reasons loaf-type cheese sometimes ferments or continues to ferment, or at any rate gases are formed within the cheese, in which condition it is unsuitable for sale, and the containers may even be broken by reason of the great gas pressure.

It is a further object of the invention to overcome those difficulties, and more specifically to provide a loaf-type cheese and the process of making it which will prevent the secondary fermentation or production of gas, thus not only preventing the swelling of the cheese, or the breaking of containers, but greatly improving the keeping quality of the cheese.

I have found that if calcium sulphite, preferably in a powdered form, is added to the heated natural cheese or cheese-containing composition and thoroughly mixed therewith, before the batch is put into the containers in which it is to be shipped, that fermentation and formation of gases is prevented and that the cheese will keep indefinitely, even at incubator temperatures of approximately 97 degrees Fahrenheit. Furthermore, the loaf-type cheese so prepared shows first quality, with the body of A No. 1 fancy cheese, even after a long period in an incubator.

The amount of calcium sulphite which should be mixed with the batch depends upon various factors. All of the causes of secondary fermentation may not be definitely known and some of them may be due to ingredients added to the natural cheese. However the cheese itself may contain bacteria, yeast or other organisms which cause secondary fermentation, and that condition may be determined by inspection of the natural cheese itself, perhaps most expeditiously before it undergoes the comminuting process. An experienced cheese maker can, by taking a section of the natural cheese, determine approximately how much it is apt to ferment, or in what state of fermentation it is already in. He will accordingly add to the batch of heated cheese, as hereinbefore described, an amount of calcium sulphite which from his experience he has found will prevent the fermentation. I have found that the cheeses which are most apt to ferment are such cheeses as brick, American or Limburger.

The amount of calcium sulphite necessary, I have found, will vary from approximately eight ounces to twelve ounces for every one hundred pound batch of natural cheese. That is, the percentage of calcium sulphite by weight is approximately five tenths of one per centum to approximately seventy five one hundredths of one per centum of the weight of the natural cheese.

Obviously the amount of calcium sulphite necessary will also depend upon whether all of the cheese used to make up the one hundred pound batch, for example, is all in the same state or whether a part of it is considered by the cheese maker to be in such state as to require little or no addition of calcium sulphite and another part is considered to be in such state as to require a considerable amount of calcium sulphite to prevent fermentation.

In view of the foregoing it will be understood by those skilled in the art that my invention as illustrated in the foregoing process and resulting product embodies advantages other than those specifically pointed out or suggested herein; also that the particular process and product may be variously changed and modified, while retaining all of those advantages or at least some of them; also that my invention and the particular embodiment thereof herein described, may be adapted to other uses, either without change, or with such changes as are within the ability of those skilled in the art, wherefore it will be understood that the disclosure herein is illustrative only, and that my invention is not limited thereto.

I claim:

1. The process of making loaf-type cheese, which includes the use of comminuted natural cheese, heating said cheese, adding to said cheese a predetermined quantity of solid calcium sulphite, by weight up to approximately seventy-five one hundredths of one per centum of the weight of said cheese, mixing said calcium sulphite with said cheese, and thereafter putting said mixture into containers.

2. The process of making loaf-type cheese, which includes mixing selected ingredients including comminuted natural cheese, heating said ingredients, adding to said ingredients a predetermined quantity of solid calcium sulphite, by weight up to approximately seventy-five one hundredths of one per centum of the weight of said cheese, mixing said calcium sulphite with said ingredients, and thereafter putting said mixture into containers.

3. The process of making loaf-type cheese, which includes the use of comminuted natural cheese, heating said cheese to a temperature of approximately 190 degrees Fahrenheit, adding to said cheese a predetermined quantity of solid calcium sulphite, by weight up to approximately seventy-five one hundredths of one per centum of the weight of said cheese, mixing said calcium sulphite with said cheese, and thereafter putting said mixture into containers.

4. The process of making loaf-type cheese, which includes the use of comminuted natural cheese, heating said cheese, adding to said cheese a quantity of solid calcium sulphite by weight approximately five tenths of one per centum to approximately seventy five one hundredths of one per centum of the weight of said cheese, mixing said calcium sulphite with said cheese, and thereafter putting said mixture into containers.

5. The process of making loaf-type cheese, which includes the use of comminuted natural cheese, heating said cheese to a temperature of approximately 190 degrees Fahrenheit, adding to said cheese a quantity of solid calcium sulphite by weight approximately five tenths of one per centum to approximately seventy five one hundredths of one per centum of the weight of said cheese, mixing said calcium sulphite with said cheese, and thereafter putting said mixture into containers.

6. The process of making loaf-type cheese, which includes the use of comminuted natural cheese, and the mixing with said cheese of a quantity of solid calcium sulphite, sufficient to prevent fermentation of said cheese after the processing of said cheese, to produce loaf-type cheese, has been completed.

7. The process of making loaf-type cheese, which includes mixing selected ingredients including comminuted natural cheese, and the mixing with said ingredients of a quantity of calcium sulphite, sufficient to prevent fermentation of said mixture of selected ingredients after the processing of said ingredients, to produce loaf-type cheese, has been completed.

CARL FREHNER.